(12) United States Patent
Kunimochi et al.

(10) Patent No.: US 6,837,588 B2
(45) Date of Patent: Jan. 4, 2005

(54) SPREAD ILLUMINATING APPARATUS WITH MEANS FOR REFLECTING LIGHT DISPERSELY

(75) Inventors: Toru Kunimochi, Iwata-gun (JP); Shingo Suzuki, Iwata-gun (JP); Motoji Egawa, Iwata-gun (JP); Takahiro Shimura, Iwata-gun (JP); Shigeyuki Oishi, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/321,655

(22) Filed: Dec. 18, 2002

(65) Prior Publication Data

US 2003/0117792 A1 Jun. 26, 2003

(30) Foreign Application Priority Data

Dec. 25, 2001 (JP) .................................. 2001-391963
Feb. 25, 2002 (JP) .................................. 2002-048200

(51) Int. Cl.$^7$ ............................................... F21V 7/04
(52) U.S. Cl. .................... 362/31; 362/27; 362/555; 362/558; 362/560; 362/561; 362/224; 362/296; 362/309; 362/311; 362/328; 362/330
(58) Field of Search ........................... 362/31, 26, 27, 362/555, 558, 559, 560, 561, 223, 224, 296, 309, 311, 328, 330, 331

(56) References Cited

U.S. PATENT DOCUMENTS

| | | | | |
|---|---|---|---|---|
| 4,924,356 A | * | 5/1990 | French et al. | 362/31 |
| 5,420,761 A | * | 5/1995 | DuNah et al. | 362/31 |
| 6,290,364 B1 | * | 9/2001 | Koike et al. | 362/31 |
| 6,330,111 B1 | * | 12/2001 | Myers | 359/599 |
| 6,742,921 B2 | * | 6/2004 | Umemoto et al. | 362/561 |

* cited by examiner

*Primary Examiner*—Stephen Husar
*Assistant Examiner*—Sharon Payne
(74) *Attorney, Agent, or Firm*—Oliff & Berridge PLC

(57) ABSTRACT

A spread illuminating apparatus having a light conductive plate made of a light transmissible material and a bar-like lamp disposed along and close to an end face of the light conductive plate. The spread illuminating apparatus also having a light reflection pattern having a stair-like configuration from a cross-sectional perspective. The light reflection pattern is formed on a major face of the light conductive plate. The spread illuminating apparatus also has a light dispersive-reflection pattern which has, for example, a plurality of convex surfaces which are formed on a major face of the light conductive plate opposite to the major face of the light conductive plate, which is provided with the light reflection pattern.

13 Claims, 9 Drawing Sheets

SPREAD ILLUMINATING APPARATUS WITH MEANS FOR REFLECTING LIGHT DISPERSELY

BACKGROUND OF THE INVENTION

1. Field of the Invention

The present invention relates to a spread illuminating apparatus, and more particularly to a spread illuminating apparatus used with a liquid crystal display.

2. Description of the Related Art

A liquid crystal display (hereinafter referred to as LCD), which is small in power consumption, low in profile, and light in weight, is heavily used in electric products such as a personal computer (hereinafter referred to as PC), a cellular phone, and the like, and is increasingly demanded.

Since a liquid crystal of the LCD does not emit light by itself, the LCD requires an illuminating means to radiate light on the liquid crystal when used in a place where sunlight or interior lighting is not fully available.

A PC, particularly notebook-type PC, and a cellular phone are required to be lower in profile and smaller in power consumption, and the requirements are fulfilled by a spread illuminating apparatus of side light type.

A conventional spread illuminating apparatus of side light type is shown in FIG. 13. In FIG. 13, a spread illuminating apparatus 1' generally comprises a light conductive plate 2 made of a light transmissible material, and a bar-like lamp 5 disposed along and close to an end face 8 of the light conductive plate 2. Light emitted from the light lamp 5 is introduced into the light conductive plate 2 and directed to an LCD (not shown) disposed under the light conductive plate 2.

The lamp 5 comprises a light conductive bar 3 made of a light transmissible material, and two spot-like light sources 4, 4 (for example, light emitting diodes) disposed facing respective end faces 6, 7 of the light conductive bar 3. The light conductive bar 3 has an optical path conversion means 12 formed on a side face thereof opposite to a side face 9 facing the end face 8 of the light conductive plate 2. The optical path conversion means 12 comprises, for example, a plurality of grooves shaped triangular in section, and is adapted to guide light, which is emitted from the light source 4 into the light conductive bar 3, toward the end face 8 of the light conductive plate 2 in a substantially uniform manner. The light conductive bar 3 is disposed with its side face 9 facing the end face 8 of the light conductive plate 2 with a predetermined distance therebetween.

The light conductive bar 3 has a light reflection member (frame) 13 substantially U shaped in section and disposed therearound. The light reflection member 13 covers the longitudinal faces of the light conductive bar 3 except the side face 9 facing the light conductive plate 2.

The light conductive plate 2 has a light reflection pattern 19 formed on its upper face 15, and has a plain surface on its lower face 26. The light reflection pattern 19 has a stair-like configuration in section, comprising a plurality of small surfaces 17 having its longitudinal direction parallel to the length of the light conductive bar 3, and a plurality of large surfaces 18 each present between two adjacent small surfaces 17. The light reflection pattern 19 is adapted to guide light, which is emitted from the lamp 5 into the light conductive plate 2, toward the LCD (not shown) disposed under the light conductive plate 2. The light reflection pattern 19 may alternatively comprise a plurality of grooves, and a plurality of flat portions present between two adjacent grooves.

In the front-lighting system where an illuminating apparatus using the light reflection pattern 19 is disposed over the front face of a reflection type LCD element, when light reflected at the reflection type LCD element passes through the light reflection pattern 19, an interference fringe (moire pattern) appears, which is formed by the striping generated due to a difference in light outgoing efficiency resulting from a difference in refractive index between at the small surface 17 and at the large surface 18, and by the arrangement of the mosaic pattern (cell boundary) of crystal cells constituting pixels of the LCD, and which is detrimental to the observation of the image on the display. The moire pattern is closely related with the configuration of the light reflection pattern 19, specifically, the dimensions and inclinations of the small surfaces 17 and the large surfaces 18, or the like.

Also, there appears a light and dark striping of another kind different from the above described moire pattern. The light and dark striping is peculiar to the front-lighting system, and is characterized in that its location and striping interval change according to the position of the observer's eye. It has become apparent that the light and dark striping is generated by reflected light due to Fresnel reflection at the lower face of the light conductive plate opposite to the face provided with the light reflection pattern, that is, reflected light caused by the difference in refractive index between the light conductive plate and the air. It has been known that this reflected light has an adverse influence on the contrast characteristics of the display device, and the light conductive plate normally has non-reflective coating applied to its lower face for improving contrast.

The current non-reflective coating suppresses light reflection significantly but not down to 0% across the visible display area, normally allowing some 0.2% of light incident thereon to be reflected. This slight amount of reflected light generates the light and dark striping.

SUMMARY OF THE INVENTION

The present invention has been made in view of the above problems, and it is an object of the present invention to provide a spread illuminating apparatus, in which the light and dark striping of a kind different from the moire pattern is suppressed without increasing the number of components and also without detriment to the usability of light.

In order to achieve the object, according to a first aspect of the present invention, a spread illuminating apparatus comprises: a light conductive plate made of a light transmissible material; a bar-like lamp disposed along and close to an end face of the light conductive plate; a light reflection pattern having a stair-like configuration in section, and formed on a major face of the light conductive plate; and a light dispersive-reflection pattern formed on a major face of the light conductive plate opposite to the major face provided with the light reflection pattern.

According to a second aspect of the present invention, in the spread illuminating apparatus of the first aspect, the light dispersive-reflection pattern comprises a plurality of convex surfaces arrayed continuous with one another in parallel.

According to a third aspect of the present invention, in the spread illuminating apparatus of the first aspect, the light dispersive-reflection pattern comprises a plurality of convex surfaces arrayed in parallel to one another, and a plurality of flat portions each present between two adjacent convex surfaces.

According to a fourth aspect of the present invention, in the spread illuminating apparatus of the second or third aspect, a maximum angle made by a tangent line to the convex surface with respect to an imaginary datum parallel to the light conductive plate does not exceed 3 degrees.

According to a fifth aspect of the present invention, in the spread illuminating apparatus of the first aspect, the light dispersive-reflection pattern comprises a plurality of concave surfaces arrayed continuously with one another in parallel.

According to a sixth aspect of the present invention, in the spread illuminating apparatus of the first aspect, the light dispersive-reflection pattern comprises a plurality of concave surfaces arrayed in parallel to one another, and a plurality of flat portions each present between two adjacent concave surfaces.

According to a seventh aspect of the present invention, in the spread illuminating apparatus of the fifth or sixth aspect, a maximum angle made by a tangent line to the concave surface with respect to an imaginary datum parallel to the light conductive plate does not exceed 3 degrees.

According to an eighth aspect of the present invention, in the spread illuminating apparatus of the first aspect, the light dispersive-reflection pattern comprises a plurality of polygonal surfaces each composed of a plurality of flat surfaces, and arrayed continuously with one another in parallel, and an angle made by each of the flat surfaces with respect to an imaginary datum parallel to the light conductive plate varies stepwise and gradually.

According to a ninth aspect of the present invention, in the spread illuminating apparatus of the first aspect, the light dispersive-reflection pattern comprises a plurality of polygonal surfaces each composed of a plurality of flat surfaces, and arrayed in parallel to one another, and a plurality of flat portions each present between two adjacent polygonal surfaces, and an angle made by each the flat surfaces with respect to an imaginary datum parallel to the light conductive plate varies stepwise and gradually.

According to a tenth aspect of the present invention, in the spread illuminating apparatus of the eighth or ninth aspect, a maximum angle of the angles made by the flat surfaces with respect to the imaginary datum does not exceed 3 degrees.

According to an eleventh aspect of the present invention, in the spread illuminating apparatus of the first aspect, the light dispersive-reflection pattern is oriented at a predetermined angle with respect to the light reflection pattern.

According to a twelfth aspect of the present invention, in the spread illuminating apparatus of the eleventh aspect, the predetermine angle ranges from 10 to 35 degrees.

Consequently, according to the present invention, the 0.2% light rays, which are incident on the lower face of the light conductive plate but fail to exit out from there while the remaining incident light rays exit out, and which are conventionally reflected at the lower face of the light conductive plate in the uniform direction back toward the light reflection pattern, are now reflected back in random directions by means of the light dispersive-reflection pattern formed on the lower face of the light conductive plate, consequently making the light rays exit out the light conductive plate through the light reflection pattern in random directions, whereby it does not happen that the angle ranges of "no light coming from the light reflection pattern" are aligned to one another, and therefore the light and dark striping is not recognizable.

In this connection, the same effect can be realized without detriment to other display performance when the pattern is configured such that the maximum angle made by the tangent line to the convex, concave or polygonal surface with respect the datum parallel to the light conductive plate is 3 degrees or smaller The light dispersive-reflection pattern is formed directly on the light conductive plate without using any additional materials or components, thereby holding down cost increase.

Also, when the light dispersive-reflection pattern is used in combination with the light reflection pattern configured with random intervals or misaligned at a predetermined angle therewith, the moire pattern, as well as the light and dark striping, is effectively suppressed.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENTS

Preferred embodiments of the present invention will be described with reference to the drawings. The spread illuminating apparatus of the present invention is characterized by forming, on the lower face of a light conductive plate of a conventional spread illuminating apparatus, a light dispersive-reflection pattern which is adapted to reflect light in random directions toward a light reflection pattern, and in the construction drawings of the respective embodiments the construction elements corresponding to the elements of the prior art shown in FIG. 13 have the same reference numbers and will not be described in detail.

Figure 1:
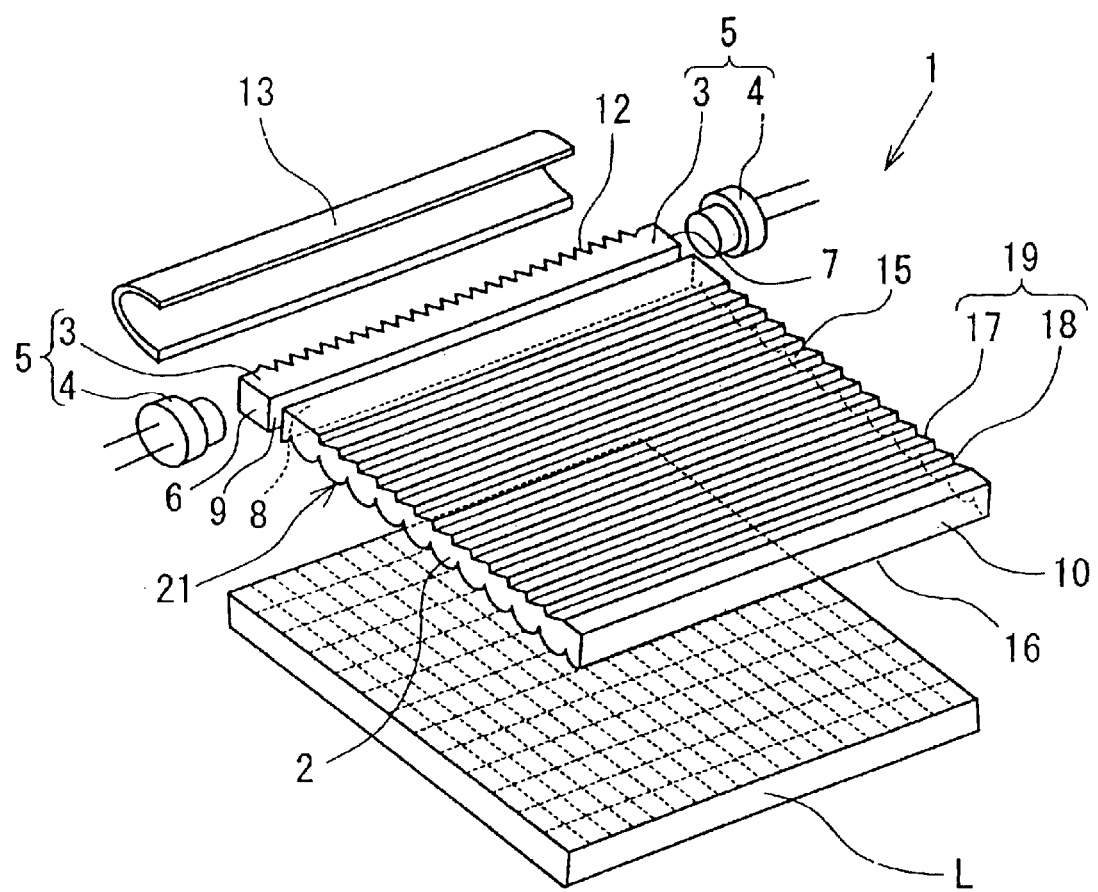
FIG. 1 is a perspective view of a spread illuminating apparatus according to a first embodiment of the present invention.

Referring to FIG. 1, a spread illuminating apparatus 1 generally comprises: a light conductive plate 2; a bar-like lamp 5 disposed along and close to an end face 8 of the light conductive plate 2; and a light reflection member (frame) 13.

The light conductive plate 2 has a light reflection pattern 19 formed on its upper face (observation surface) 15. The light reflection pattern 19 is adapted to guide light, which is introduced into the light conductive plate 2 through the end face 8, toward an LCD L disposed under a lower face 16 of the light conductive plate 2 in a uniform manner regardless of the distance from the lamp 5. The lamp 5 comprises: a light conductive bar 3 made of a light transmissible material, and having an optical path conversion means 12 on one side face thereof, and spot-like light sources 4, 4 disposed respectively on both end faces 6, 7 of the light conductive bar 3. The light reflection member 13 is substantially U-shaped in section and is set so as to enclose the light conductive bar 3.

The light reflection pattern 19 has a stair-like configuration in section, comprising: a plurality of small surfaces 17 having its longitudinal direction oriented in parallel to or at a predetermined angle with the length of the light conductive bar 3 (FIG. 1 shows a parallel orientation); and a plurality of large surfaces 18 each present between two adjacent small surfaces 17.

The light conductive plate 2 has a light dispersive-reflection pattern 21 formed on its lower face 16, and the surface of the light dispersive-reflection pattern 21 is provided with a non-reflective coating (not shown). The light dispersive-reflection pattern 21, like the light reflection pattern 19 formed on the upper face 15 of the light conductive plate 2, is oriented in parallel to or at a predetermined angle with (an embodiment of orientation "at a predetermined angle" will be described herein later) the length of the light conductive bar 3. Light rays, which account for some 0.2% of entire light rays incident on the lower face 16 of the light conductive plate 2, namely on the light dispersive-reflection pattern 21, and which, despite of the non-reflective coating, fail to exit out the light conductive plate 2 as above described, are reflected in random directions toward the light reflection pattern 19 thus exiting out from the light reflection pattern 19 also in random directions, thereby suppressing the generation of the light and dark striping which appears according to the position of the observer's eye (this is to be described in detail later).

In FIG. 1, the light reflection pattern 19 has a stair-like configuration in section, comprising small surfaces and large surfaces, but is not limited to the configuration and may alternatively comprise grooves shaped triangular in section and flat portions present between two adjacent grooves, or may comprise grooves shaped trapezoidal in section, grooves with multiple steps, or grooves with a curved outline.

Also, in FIG. 1, the lamp 5 has two light sources 4, 4 disposed respectively on the both end faces 6, 7 of the light conductive bar 3, but is not limited to the configuration and may alternatively have one light source 4 disposed only one of the end faces 6, 7. Further, the lamp 5 may be a fluorescent tube instead of a combination of the light conductive bar 3 and the light source(s) 4. And, the light conductive plate 2 has one lamp 5 disposed along and close to the one end face 8 but is not limited to the configuration and may alternatively have two lamps 5 disposed along and close to the end faces 8, 10, respectively.

The light and dark striping above described is attributable to the configuration of the light reflection pattern and to the undesired light reflected at the lower face of the light conductive plate, and is considered to be generated by the following mechanism.

Figure 13:
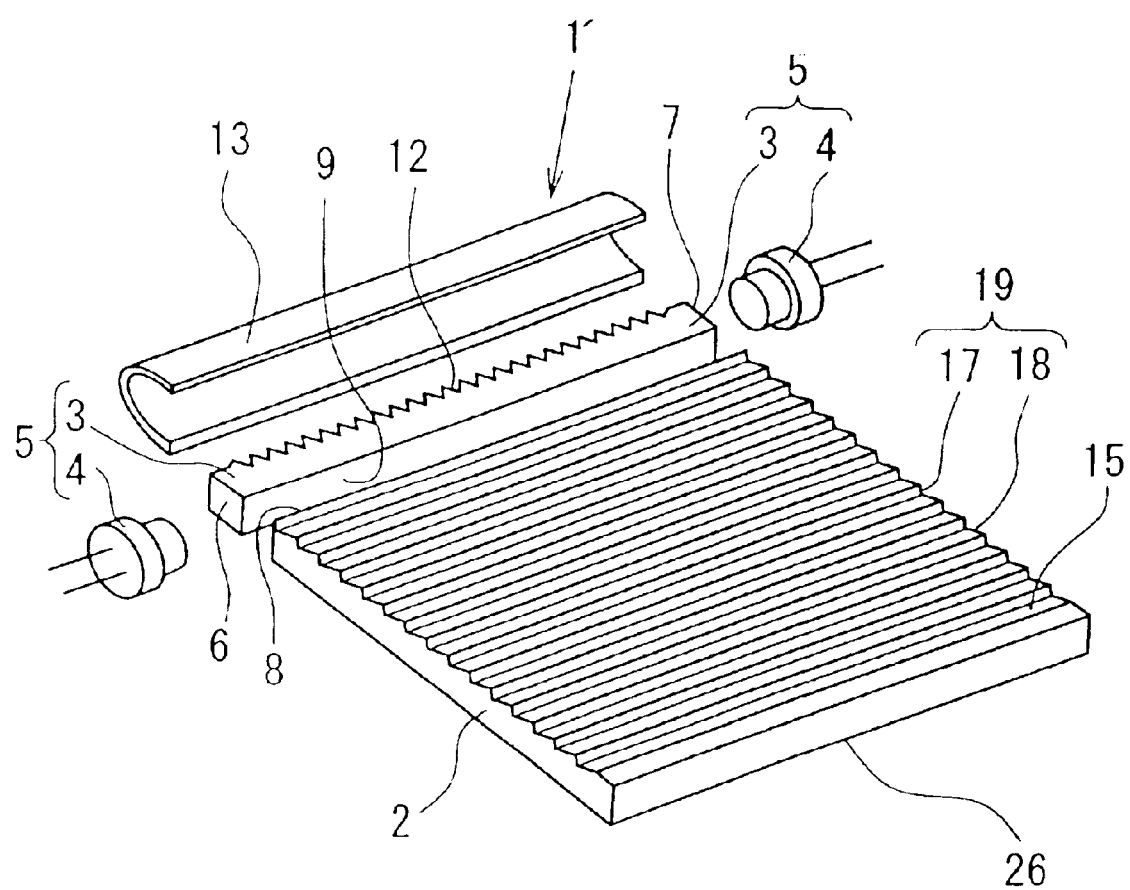
FIG. 13 is an exploded perspective view of a conventional spread illuminating apparatus.

The mechanism will be described with reference to FIGS. 2 and 3 by way of the light conductive plate 2 of the conventional spread illuminating apparatus 1' shown in FIG. 13. In the explanation of the mechanism, the term "light ray(s)" used in the description and illustrated in FIGS. 2 to 5 is referred to the above mentioned 0.2% light rays out of the entire light rays that are reflected at the light reflection pattern 19 and progress toward the lower face 16 or 26 of the light conductive plate 2, assuming that the 0.2% light rays are reflected at the lower surfaces 12 or 26 back toward the light reflection pattern 19 with the remaining light rays passing through the lower face 16 or 26 to exit out the light conductive plate 2.

Figure 2:
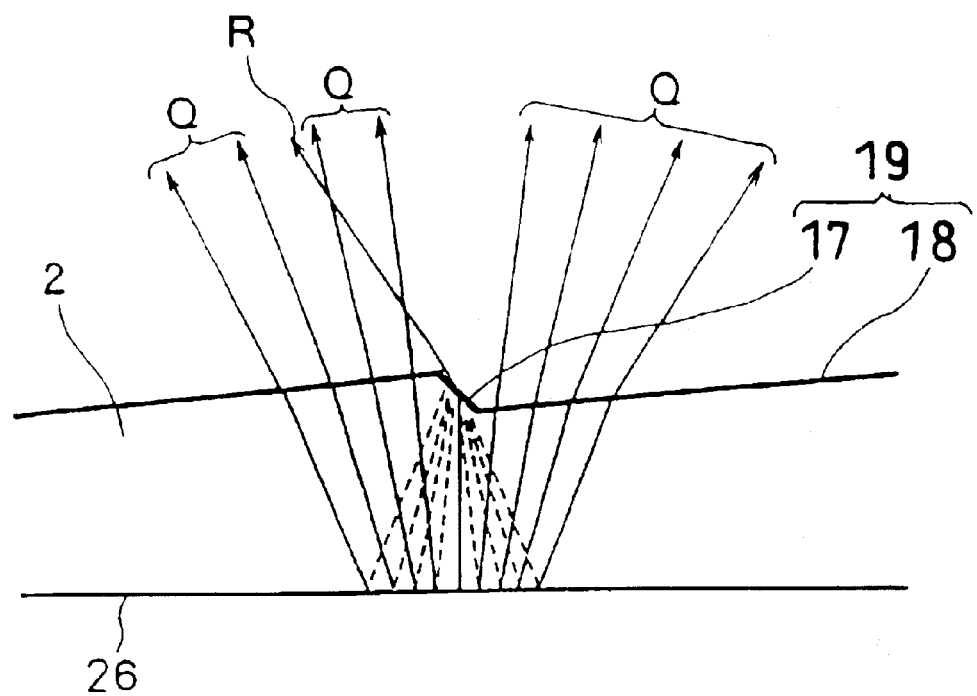
FIG. 2 is an explanatory view of travel paths of light rays, showing how a light and dark striping is caused in a conventional apparatus.
Figure 3:
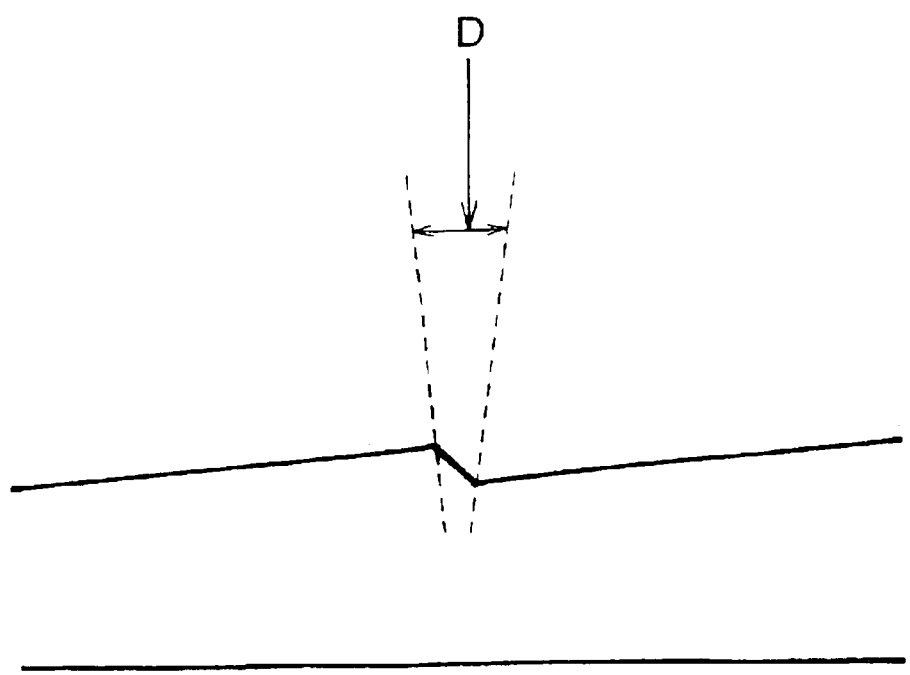
FIG. 3 is an explanatory view of angle ranges of exiting direction of the light rays of FIG. 2.

Referring to FIG. 2, when light, which is emitted from the lamp 5 into the light conductive plate 2, is reflected at the small surface 17 of the light reflection pattern 19 toward the lower face 26 of the light conductive plate 2, and then reflected at the plain surface of the lower face 26 toward the light reflection pattern 19, light rays Q and a light ray R exit out the light conductive plate 2 via the light reflection pattern 19 such that the light rays Q are refracted by a large surface 18 and pass therethrough and the light ray R is refracted by the small surface 17 and passes therethrough. The refraction directions of the light rays Q are significantly different from that of the light ray R, which, as shown in FIG. 3, results in generating an angle range D where light rays exiting out the light conductive plate 2 are not present. When the observer's eye is positioned in the angle range D, the angle range D is recognized as a dark area. The light reflection pattern 19 includes a plurality of small surfaces 17 (though only one is shown in FIGS. 2 and 3), so when the light reflection pattern 19 has the small surfaces formed at regular intervals, a plurality of angle ranges D are generated and there appear a plurality of dark areas.

Figure 4:
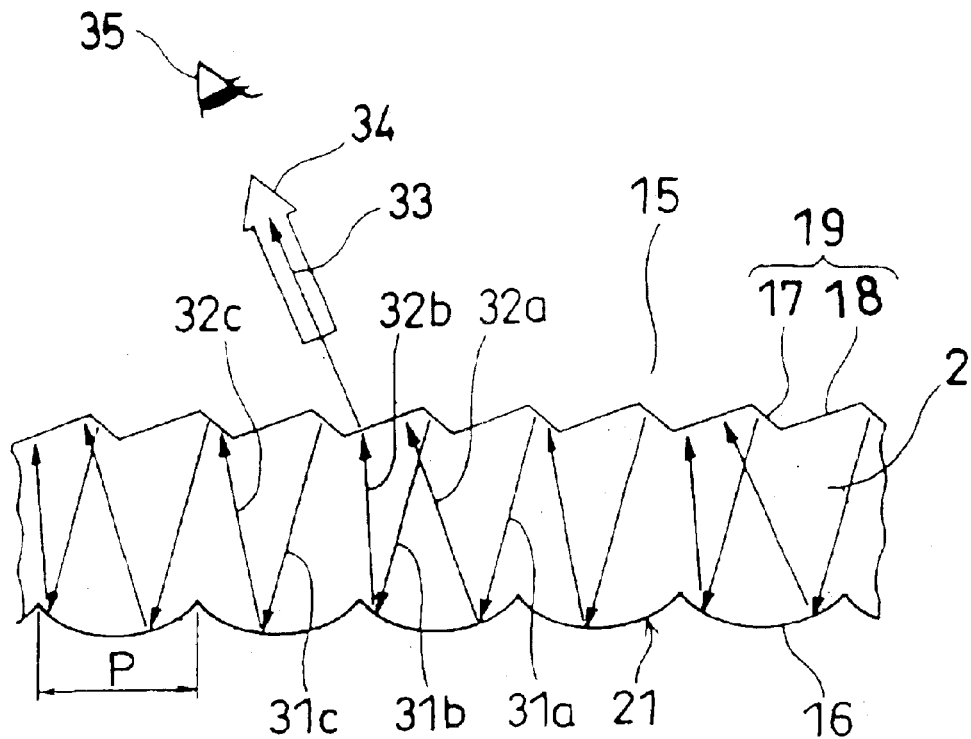
FIG. 4 is a partial cross-sectional view of a light conductive plate of FIG. 1.

Referring to FIG. 4, the arrows indicate travel paths of light rays, which are reflected at the small surfaces 17 of the light reflection pattern 19 formed on the upper face 15 of the light conductive plate 2 toward the light dispersive-reflection pattern 21 formed on the lower face 16 of the light conductive plate 2, reflected at the light dispersive-reflection pattern 21 toward the light reflection pattern 19, refracted by the surfaces of the light reflection pattern 19, and exit out the light conductive plate 2.

Figure 5:
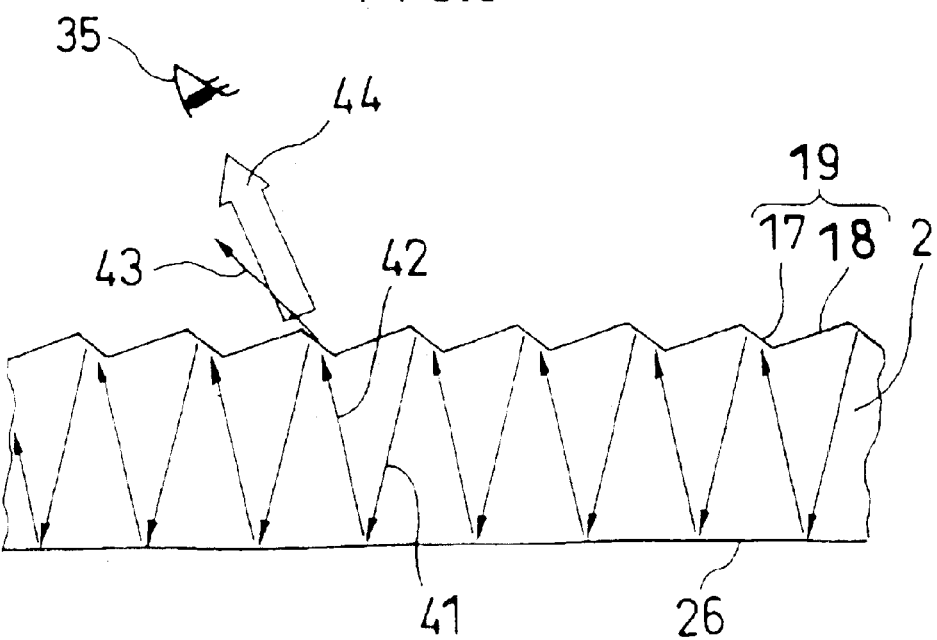
FIG. 5 is a partial cross-sectional view, for comparison purpose, of a light conductive plate of a conventional apparatus.

Referring to FIG. 5 provided for the purpose of comparison with FIG. 4, the arrows indicate travel paths of light rays in the conventional light conductive plate 2 having a plain surface on the lower face 26.

In FIGS. 4 and 5, an observer's eye 35 is shown to be positioned near the light conductive plate 2, but actually is positioned far therefrom. So, an observer recognizes respective arrows as having a uniformly aligned outgoing angle at a given area of the light reflection pattern. Light rays emitted from the lamp 5 into the light conductive plate 2 are reflected at various portions thereof including the small surfaces 17 and the large surfaces 18 of the light reflection pattern 19, but only light rays 41 reflected at the small surfaces 17 in the same direction are indicated.

In FIG. 5, the light rays 41 are reflected at the plain surface of the lower face 26 to turn into light rays 42 which all progress in the same direction. The light rays 42 are refracted by the small surfaces 17 to turn into light rays 43 which all exit out the light conductive plate 2 in the same direction. When the observer's eye 35 is at a place positioned in the direction indicted by an arrow 44, one particular light ray 43 exiting out in the direction not parallel to the arrow 44 does not progress to the observer's eye 35, which means that the observer's eye 35 is in "the angle range D of no light from the light reflection pattern" shown in FIG. 3, and which makes the observer recognize the portion as a dark area of a striping.

On the other hand, in FIG. 4, for example, light rays 31a, 31b and 31c (corresponding to the light rays 41 in FIG. 5) are dispersively reflected at the light dispersive-reflection pattern 21 formed on the lower face 16 of the light conductive plate 2 thereby turning into light rays 32a, 32b and 32c, respectively, which progress in their respective different directions. The light rays 32a, 32b and 32c are refracted by the surfaces of the light reflection pattern 19 and exit out the light conductive plate 2 in their different directions. In the figure, only one light ray 33 originating from the light ray 32b and exiting out so as to overlap the arrow 34 is shown.

As shown in FIG. 1, the light dispersive-reflection pattern 21 faces the LCD L, comprises a plurality of surfaces each shaped convex in section, having its longitudinal direction in parallel to the length of the light conductive bar 3, and continuously arrayed in a direction normal to the length of the light conductive bar 3 forming a valley between two adjacent surfaces, and thus is oriented parallel to the light reflection pattern 19. The light dispersive-reflection pattern 21 will be further described with reference to FIG. 6, which is exaggerated for ease of understanding. The degree of the convexity, specifically, the distance from the apex of the convex surface to the bottom level of the valley formed between two adjacent convex surfaces is preferably determined such that a maximum angle $\theta$max, which is defined by a tangent line S with respect to an imaginary datum T parallel to the light conductive plate 2, is 3 degrees or smaller.

With the light dispersive-reflection pattern 21 comprising the convex surfaces, on which an angle $\theta$i defined by a tangent line with respect to the datum T varies continuously, the light rays 31a, 31b and 31c reflected at respective small surfaces 17 in the same direction are reflected back toward the light reflection pattern 19 to turn respectively into light rays 32a, 32b and 32c to progress in respective different directions. Thus, the light rays, which are reflected at respective small surfaces 17 of the light reflection pattern 19 toward the lower face of the light conductive plate 2, and which then, in case of the light conductive plate 2 (shown in FIG. 5) of the conventional spread illuminating apparatus, are to be reflected at the plain surface of the lower face 26 in the same direction and refracted by respective small surfaces 17 to exit out in the same direction, are, in case of the light conductive plate 2 (shown in FIG. 4) of the present invention, adapted to be reflected at the light dispersive-reflection pattern 21 in respective different directions and refracted by various portions, mostly large surfaces 18, of the light reflection pattern 19 to exit out in respective different directions.

Accordingly, when the observer's eye 35 is at the position indicated by an arrow 34, which is the same position indicated by the arrow 44 as shown in FIG. 5, the light ray 33 exits out to the observer's eye 35, which means that respective angle ranges D of "no light from the light reflection pattern" are not uniformly oriented, thereby preventing the light and dark striping conventionally incurred. And, not only the light rays 31a, 31b and 31c shown in FIG. 4 but also all of the 0.2% light rays, which are incident on the light dispersive-reflection pattern 21 but fail to exit out from there, are reflected thereat in random directions, consequently exiting out from the light reflection pattern 19 in random directions, whereby the light and dark striping is suppressed from appearing.

The pitch P of the light dispersive-reflection pattern 21 indicated in FIG. 4 is desirably set to differ from that of the light reflection pattern 19, which is more effective in suppressing the light and dark striping.

Figure 6:
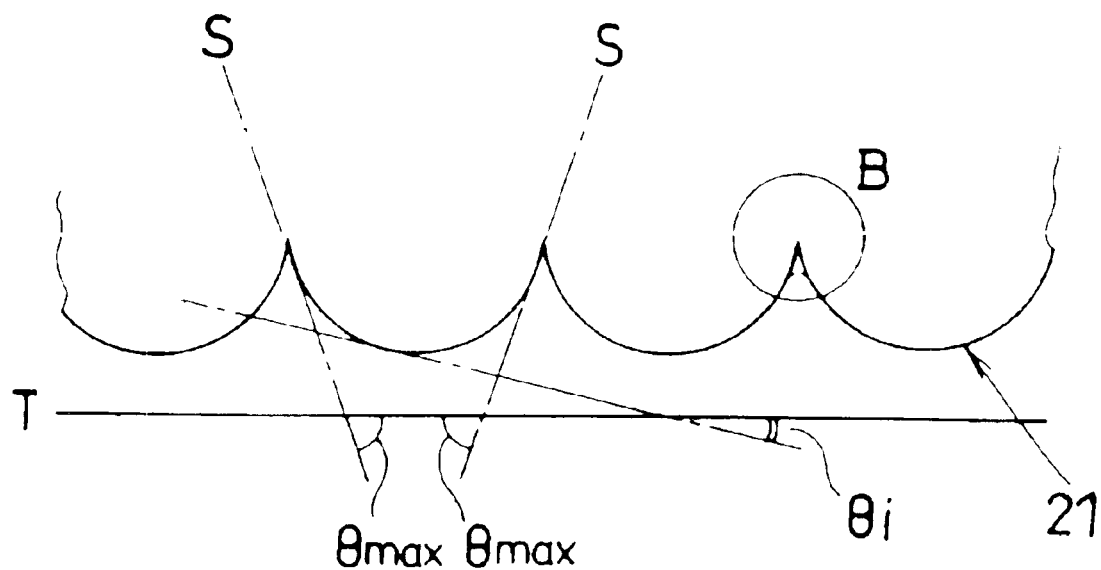
FIG. 6 is a partial cross-sectional view of a light dispersive-reflection pattern according to the first embodiment of the present invention.
Figure 7:
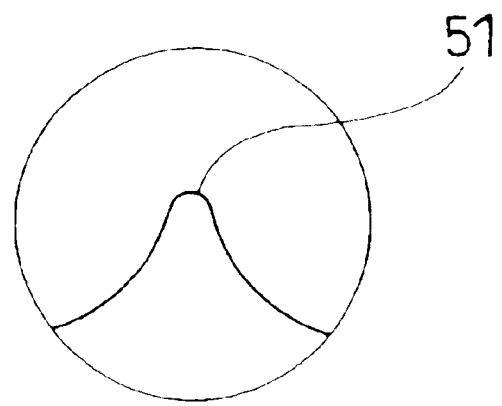
FIG. 7 is an enlarged view of the part B of FIG. 6.

Referring to FIG. 7 showing an enlarged view of the part B in FIG. 6, a bottom 51 of the valley between two adjacent convex surfaces of the light dispersive-reflection pattern 21 is rounded so that the light dispersive-reflection pattern 21 is less noticeable when viewed from the observing side thereby enhancing the level of visibility.

Figure 8:
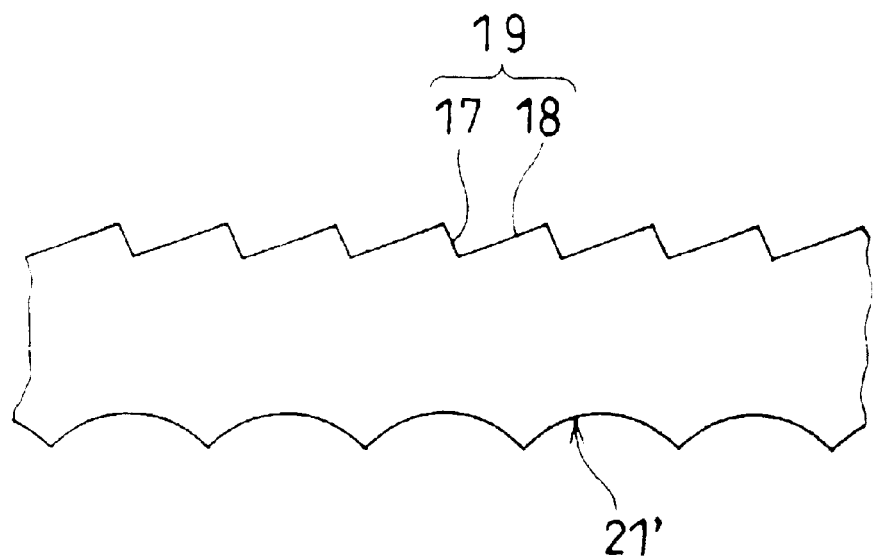
FIG. 8 is a partial cross-sectional view of a light conductive plate according to a second embodiment of the present invention.
Figure 9:
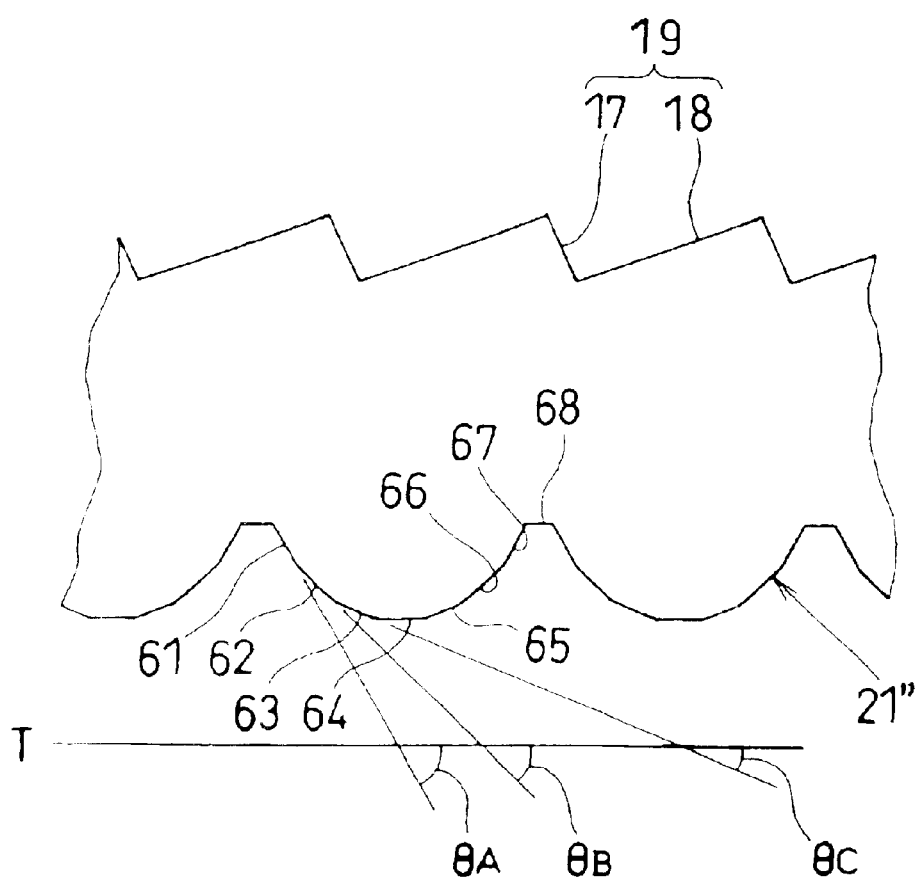
FIG. 9 is a partial cross-sectional view of a light conductive plate according to a third embodiment of the present invention.
Figure 10:
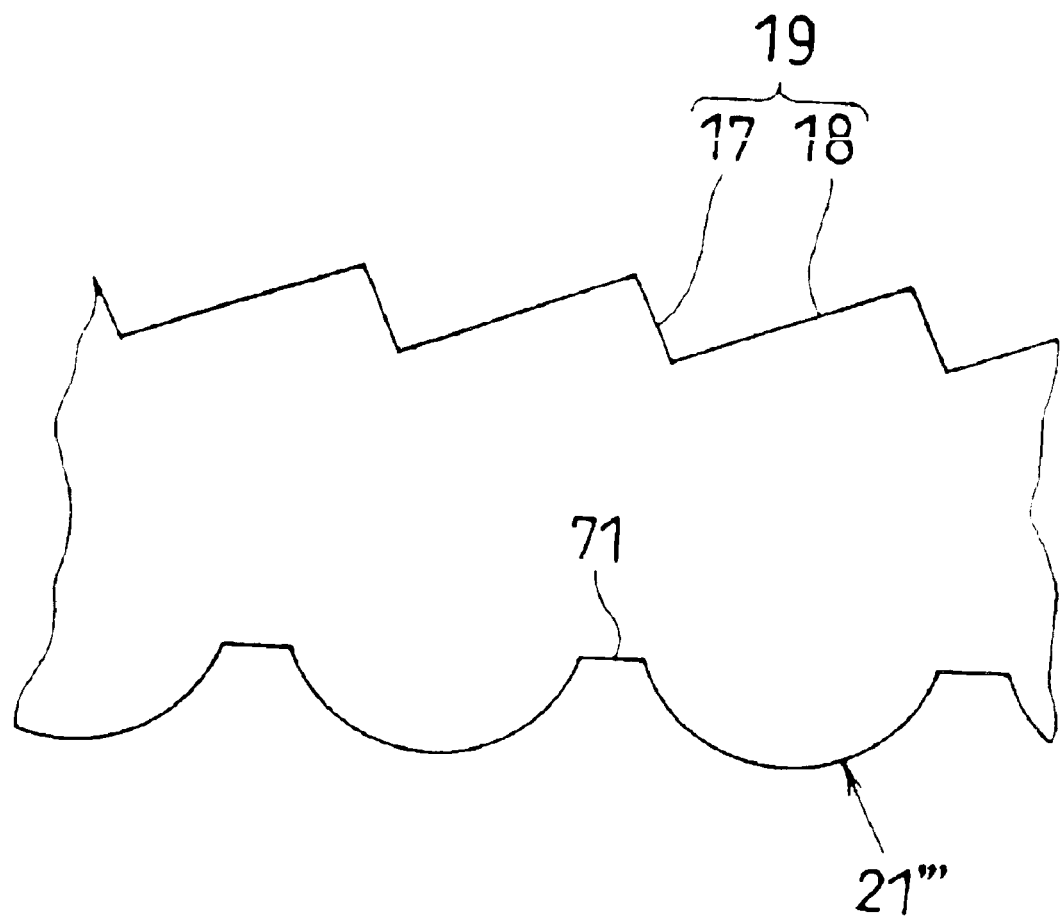
FIG. 10 is a partial cross-sectional view of a light conductive plate according to a fourth embodiment of the present invention.

The light dispersive-reflection pattern does not have to be configured as shown in FIG. 6, but may alternatively be configured as shown in FIGS. 8 to 10 (these figures are exaggerated for ease of understanding).

Referring to FIG. 8, a light dispersive-reflection pattern 21' comprises a plurality of surfaces each shaped concave in section and continuously arrayed, and is oriented parallel to the light reflection pattern 19. In the light dispersive-reflection pattern 21', the angle θi defined by a tangent line with respect to the datum T varies continuously as in the light dispersive-reflection pattern 21 (see FIG. 6), and therefore has the same effect.

Referring to FIG. 9, a light dispersive-reflection pattern 21" comprises a plurality of polygonal surfaces each comprised of a plurality of flat surfaces (61 to 67 in this embodiment) and continuous with one another via a flat portion 68 substantially parallel to the datum T. In the light dispersive-reflection pattern 21", an angle defined by a tangent line with respect to the datum T varies gradually, though not continuously as in the preceding embodiments, rendering angles θA, θB and θC in a stepwise manner, and the same effect can be achieved as in the light dispersive-reflection pattern 21 shown in FIG. 4. In this connection, the maximum angle θA is preferably set to be 3 degrees or smaller. Also, the flat portion 68 may be eliminated.

Referring to FIG. 10, a light dispersive-reflection pattern 21'" comprises a plurality of convex surfaces continuous with one another via a flat portion 71. In other words, the light dispersive-reflection pattern 21'" has the same structure as the light dispersive-reflection pattern 21 except for the flat portion 71 present between two adjacent convex surfaces, and has the same effect with an advantage that the presence of the flat portion 71 eases the production of the pattern. The same advantage can be achieved also if the light dispersive-reflection pattern 21' shown in FIG. 8 is provided with a flat portion between two adjacent concave surfaces.

Figure 11:
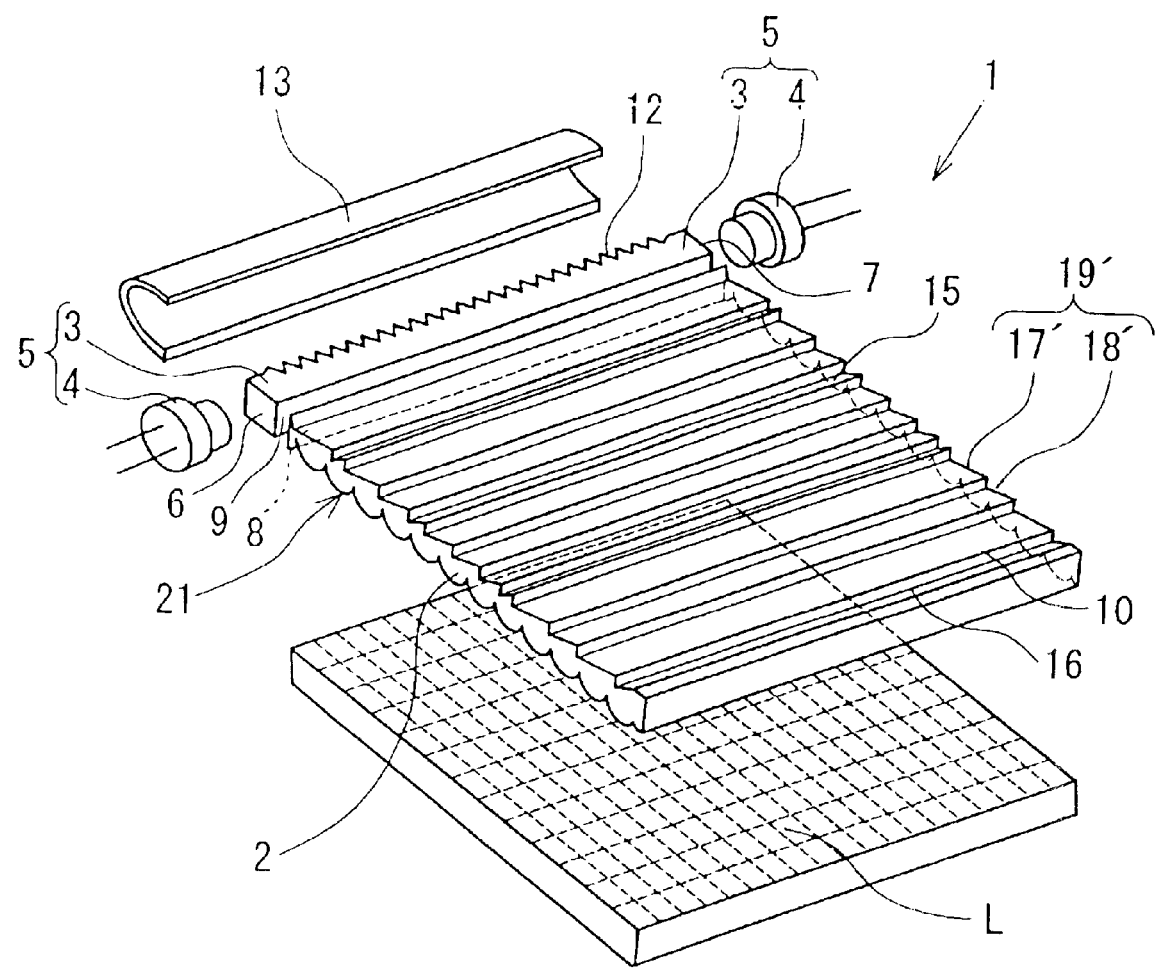
FIG. 11 is an exploded perspective view of a spread illuminating apparatus of the present invention, showing a light conductive plate including a light reflection pattern and a light dispersive-reflection pattern according to a fifth embodiment.

FIG. 11 shows an illuminating apparatus of the present invention, in which the moire pattern is suppressed as well as the light and dark striping. The difference from the embodiment shown in FIG. 4 is that the light reflection pattern 19' formed on the upper face 15 of the light conductive plate 2 is structured such that the small surfaces 17' are positioned at random intervals instead of regular intervals, that is, the large surfaces 18' are randomly dimensioned. The pattern may be oriented parallel to the length of the light conductive bar 3, or may alternatively be oriented at a predetermined angle therewith. With the above described structure of the light reflection pattern 19', it does not happen that the intervals of the mosaic pattern of the liquid crystal cells are coincident with those of the small surfaces 17', whereby the moire pattern is suppressed from appearing, while the light and dark striping is suppressed by means of the light dispersive-reflection pattern 21 formed on the lower face 16 of the light conductive plate 2 as described above. In this embodiment, the light dispersive-reflection pattern is not limited to the configuration shown in FIG. 4 but may alternatively be configured as shown in FIGS. 8 to 10. Also, the light reflection pattern may alternatively comprise grooves and flat portions, wherein the grooves are positioned at random intervals, or may be otherwise configured as conventionally available as long as it is patterned at random intervals.

Figure 12:
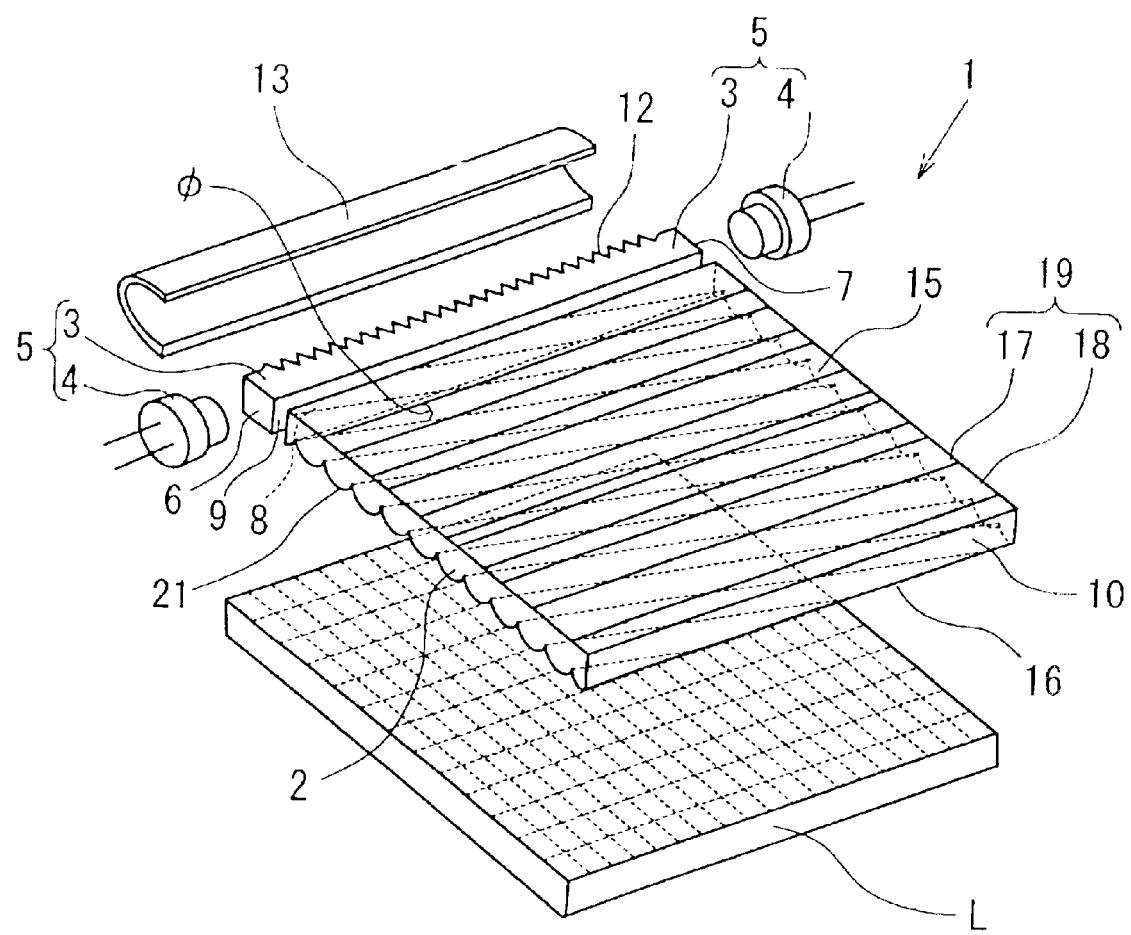
FIG. 12 is an exploded perspective view of a spread illuminating apparatus of the present invention, showing a light conductive plate including a light reflection pattern and a light dispersive-reflection pattern according to a sixth embodiment.

FIG. 12 shows another spread illuminating apparatus of the present invention, in which the moire pattern is suppressed as well as the light and dark striping as in the embodiment shown in FIG. 11. The difference from the embodiment shown in FIG. 4 is that the light reflection pattern 19 and the light dispersive-reflection pattern 21 are formed so as to be oriented at a predetermined angle φ with respect to each other. With the above described arrangement of the light reflection pattern 19 and the light dispersive-reflection pattern 21, it does not happen that the intervals of the mosaic pattern of the liquid crystal cells are coincident with those of the small surfaces 17', whereby the moire pattern is suppressed from appearing, while the light and dark striping is suppressed by means of the light dispersive-reflection pattern 21 formed on the lower face 16 of the light conductive plate 2 as described above. The experiment result shows that the moire pattern is effectively suppressed when the predetermined angle φ is set to range from 10 to 35 degrees. In this embodiment, the light dispersive-reflection pattern is not limited to the configuration shown in FIG. 4 but may alternatively be configured as shown in FIGS. 8 to 10. Also, the light reflection pattern may alternatively comprise grooves and flat portions, wherein the grooves are positioned at random intervals, or may be otherwise configured as conventionally available.

While the present invention has been illustrated and explained with respect to specific embodiments thereof, it is to be understood that the present invention is by no means limited thereto but encompasses all changes and modifications that will become possible within the scope of the appended claims.

What is claimed is:

1. A spread illuminating apparatus of side light type, comprising:
   a light conductive plate made of a light transmissible material;
   a bar-like lamp disposed along and close to an end face of the light conductive plate;
   a light reflection pattern having a stair-like configuration in section, and formed on a major face of the light conductive plate; and
   a light dispersive-reflection pattern, the light dispersive-reflection pattern being formed on a major face of the light conductive plate opposite to the major face provided with the light reflection pattern and comprising a plurality of surfaces shaped convex in section and arrayed continuously with one another in parallel,
   wherein a maximum angle made by a tangent line to the convex surface with respect to an imaginary datum parallel to the light conductive plate does not exceed 3 degrees.

2. A spread illuminating apparatus according to claim 1, wherein the light dispersive-reflection pattern comprises a plurality of flat portions each present between two adjacent convex surfaces.

3. A spread illuminating apparatus according to claim 1, wherein the light dispersive-reflection pattern is oriented at a predetermined angle with respect to the light reflection pattern.

4. A spread illuminating apparatus according to claim 3, wherein the predetermined angle ranges from 10 to 35 degrees.

5. A spread illuminating apparatus of side light type, comprising:

a light conductive plate made of a light transmissible material;

a bar-like lamp disposed along and close to an end face of the light conductive plate;

a light reflection pattern having a stair-like configuration in section, and formed on a major face of the light conductive plate; and a light dispersive-reflection pattern, the light dispersive-reflection pattern being formed on a major face of the light conductive plate opposite to the major face provided with the light reflection pattern and comprising a plurality of surfaces shaped concave in section and arrayed continuously with one another in parallels, wherein a maximum angle made by a tangent line to the concave surface with respect to an imaginary datum parallel to the light conductive plate does not exceed 3 degrees.

6. A spread illuminating apparatus according to claim 5, wherein the light dispersive-reflection pattern comprises a plurality of flat portions each present between two adjacent concave surfaces.

7. A spread illuminating apparatus according to claim 5, wherein the light dispersive-reflection pattern is oriented at a predetermined angle with respect to the light reflection pattern.

8. A spread illuminating apparatus of side light type, comprising:

a light conductive plate made of a light transmissible material;

a bar-like lamp disposed along and close to an end face of the light conductive plate;

a light reflection pattern having a stair-like configuration in section, and formed on a major face of the light conductive plate; and a light dispersive-reflection pattern, the light dispersive-reflection pattern being formed on a major face of the light conductive plate opposite to the major face provided with the light reflection pattern.

wherein the light dispersive-reflection pattern comprises a plurality of surfaces shaped polygonal in section, each composed of a plurality of flat surfaces, and arrayed continuously with one another in parallel, and wherein an angle made by each of the flat surfaces with respect to an imaginary datum parallel to the light conductive plate varies stepwise and gradually.

9. A spread illuminating apparatus according to claim 8, wherein the light dispersive-reflection pattern comprises a plurality of flat portions each present between two adjacent polygonal surfaces.

10. A spread illuminating apparatus according to claim 8, wherein a maximum angle of the angles made by the flat surfaces with respect to the imaginary datum does not exceed 3 degrees.

11. A spread illuminating apparatus according to claim 8, wherein the light dispersive-reflection pattern is oriented at a predetermined angle with respect to the light reflection pattern.

12. A spread illuminating apparatus according to claim 7, wherein the predetermined angle ranges from 10 to 35 degrees.

13. A spread illuminating apparatus according to claim 11, wherein the predetermined angle ranges from 10 to 35 degrees.

* * * * *